United States Patent
Bengtsson et al.

(10) Patent No.: US 11,621,751 B2
(45) Date of Patent: *Apr. 4, 2023

(54) OPERATING A TERMINAL DEVICE AND A BASE STATION IN A WIRELESS MIMO SYSTEM

(71) Applicant: SONY GROUP CORPORATION, Tokyo (JP)

(72) Inventors: Erik Bengtsson, Eslöv (SE); Ove Edfors, Södra Sandby (SE)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/500,718

(22) Filed: Oct. 13, 2021

(65) Prior Publication Data

US 2022/0069869 A1 Mar. 3, 2022

Related U.S. Application Data

(63) Continuation of application No. 16/494,930, filed as application No. PCT/EP2017/056414 on Mar. 17, 2017, now Pat. No. 11,152,981.

(51) Int. Cl.
*H04B 7/0456* (2017.01)
*H04L 5/00* (2006.01)
*H04W 72/04* (2023.01)

(52) U.S. Cl.
CPC ......... *H04B 7/0456* (2013.01); *H04L 5/0048* (2013.01); *H04W 72/04* (2013.01)

(58) Field of Classification Search
CPC ... H04B 7/0452; H04B 7/0456; H04L 5/0023; H04L 5/0037; H04L 5/0048; H04L 5/0051; H04W 72/04; H04W 72/042; H04W 72/0446; H04W 72/0453; H04W 72/121; H04W 72/1284

See application file for complete search history.

(56) References Cited

U.S. PATENT DOCUMENTS

| | | | |
|---|---|---|---|
| 2016/0269157 A1* | 9/2016 | Soriaga | H04B 7/0617 |
| 2018/0097595 A1* | 4/2018 | Huang | H04L 1/0009 |
| 2018/0262242 A1* | 9/2018 | Chakraborty | H04W 72/042 |

FOREIGN PATENT DOCUMENTS

EP 2426831 A1 3/2012

OTHER PUBLICATIONS

International Search Report, International Application No. PCT/EP2017/056414, dated Dec. 20, 2017, 5 pp.
(Continued)

*Primary Examiner* — Khoa Huynh
(74) *Attorney, Agent, or Firm* — Myers Bigel, P.A.

(57) ABSTRACT

The present application relates to methods for operating a terminal device and a base station of a cellular wireless multiple-input and multiple-output, MIMO, system. An uplink precoding for transmitting uplink signals from a plurality of antenna elements of the terminal device to the base station is determined. An uplink pilot signal using the uplink precoding and a radio resource of a transmission frame of the MIMO system is transmitted from the plurality of antenna elements. At the base station, a downlink precoding and uplink receive parameters are adjusted based on a receive property of the precoded uplink pilot signal from the terminal device.

16 Claims, 3 Drawing Sheets

(56) References Cited

OTHER PUBLICATIONS

Written Opinion of the International Searching Authority, International Application No. PCT/EP2017/056414, dated Dec. 20, 2017, 7 pp.
Park et al., "Evolution of Uplink MIMO for LTE-Advanced", IEEE Communication Magazine, Feb. 2011, pp. 112-121.
Ericsson, "On codebook based UL MIMO transmission with non-precoded SRS", 3GPP Draft, R1-1703224, 3GPP TSG-RAN WG1 #88, Athens, Greece, Feb. 13-17, 2017, 3 pp.

* cited by examiner

OPERATING A TERMINAL DEVICE AND A BASE STATION IN A WIRELESS MIMO SYSTEM

CROSS REFERENCE TO RELATED APPLICATIONS

This application is a continuation of U.S. patent application Ser. No. 16/494,930, filed Sep. 17, 2019, which itself is a 35 U.S.C. § 371 national stage application of PCT International Application No. PCT/EP2017/056414, filed on Mar. 17, 2017, the contents of both of which are incorporated herein by reference in their entireties. The above-referenced PCT International Application was published in the English language as International Publication No. WO 2018/166627 A1 on Sep. 20, 2018.

FIELD OF THE INVENTION

The present invention relates to a method for operating a terminal device of a cellular wireless multiple-input and multiple-output (MIMO) system and to a method for operating a base station in a cellular wireless MIMO system. The present invention relates in particular to methods for transmitting pilot signals between the terminal device and the base station in a cellular wireless MIMO system. The present invention relates furthermore to a terminal device and a base station implementing the methods.

BACKGROUND OF THE INVENTION

Data and voice communications are getting popular in daily life including personal communication via terminal devices like mobile telephones, in particular smart phones, and machine type communication (MTC), for example communication of Internet of things (IoT). Thus, increasing demands in data and voice communication require to increase data transmission performance and reliability. The so-called multiple-input and multiple-output (MIMO) technology in wireless telecommunication systems meets such requirements for transmitting information between a base station and terminal devices like mobile user equipment devices and machine type communication devices.

MIMO systems may use multiple send and receive antennas for wireless communication at the base station as well as the terminal devices. The MIMO technology forms the basis for coding techniques, which use the temporal as well as the spatial dimension for transmitting information. The enhanced coding provided in MIMO systems allows to increase the spectral and energy efficiency of wireless communication.

The base station may include a large number of antennas, for example, several tens or even in excess of one hundred antennas with associated transceiver circuitry. Systems comprising such base stations are also called massive MIMO systems. The extra antennas of the massive MIMO base station allow radio energy to be spatially focused in transmissions as well as a directional sensitive reception, which improves spectral efficiency and radiated energy efficiency. Massive MIMO may be advantageous compared to beamforming (BF) as beamforming relies on phasing the antenna elements in order to obtain the beam in a certain direction. Consequently, any signal contribution outside this beam will be attenuated. In contrast to this, in a massive MIMO system, not only all or multiple beams or signals from different radiation paths are used, but they are additionally coherently combined such that a higher gain may be achieved, the so-called (massive) MIMO gain.

Likewise, the terminal device may include a plurality of antennas to allow radio energy to be spatially focused in transmissions as well as a directional sensitive reception, which improves spectral efficiency and radiated energy efficiency.

In order to adapt transmit and receive signals at each individual antenna of the base station in accordance with the currently active terminal device, a base station logic needs information about wireless radio channel properties between the terminal device and the antennas of the base station. A pilot signaling scheme, a so-called channel sounding, is used for this purpose, which allows the base station to set configuration antenna parameters for transmitting signals, so as to focus radio energy at the terminal device and/or for receiving radio signals from the terminal device. Thus, focus may mean both phase align contribution with different path lengths and transmit only in directions that will reach the terminal device. Training sequences, so-called pilot signals, may be transmitted from the terminal device in a resource that is dedicated to the terminal device. Pilot signals from different terminal devices need to be orthogonal in order for the base station to identify the configuration parameters for the plurality of antennas for each one of the terminal devices. Orthogonality may be achieved by using time division multiple access (TDMA), code division multiple access (CDMA) or frequency division multiple access (FDMA) technologies or a combination thereof.

For example, systems according to LTE (Long Term Evolution) technologies and standards, support both frequency division duplex (FDD) and time division duplex (TDD) modes. While FDD makes use of paired spectra for uplink (UL) and downlink (DL) transmission separated by a duplex frequency gap, TDD splits one frequency carrier into alternating time periods for transmission from the base station to the terminal device and vice versa. Both modes have their own frame structures within LTE and these are aligned with each other meaning that similar hardware can be used in the base stations and terminal devices to allow for economy of scale. The LTE transmission is structured in the time domain in radio frames. Each of these radio frames is 10 ms long and consists of 10 sub-frames of 1 ms each. The Orthogonal Frequency Division Multiple Access (OFDMA) sub-carrier spacing in the frequency domain is 15 kHz. Twelve of these sub-carriers together allocated during a 0.5 ms timeslot are called a resource block. Each resource block may contain a plurality of resource elements. An LTE terminal device can be allocated, in the downlink or uplink, a minimum of two resource blocks during one sub-frame (1 ms). A resource block, defined by its time slot and set of sub-carriers, is the smallest unit of resources that can be allocated to a terminal device or user. Data transmitted via resource blocks in a plurality of consecutive frames is also called "stream".

In case the MIMO system uses time division multiple access (TDMA) or frequency division multiple access (FDMA), each terminal device can transmit a pilot signal in a specifically allocated resource (defined by its time slot and frequency range within a frame). The pilot signal can be received by the antennas of the base station and analyzed by the base station logic for channel sounding the uplink radio channel. Vice versa, the base station may transmit a pilot signal in an allocated resource to a terminal device for channel sounding the downlink radio channel. The timeslots and frequency ranges, in which terminal devices may transmit their pilot signals in combination, are also referred to as pilot portion of a transmission frame. The remaining timeslots and frequency ranges of the frame may be used for downlink (DL) and uplink (UL) data and control transmission. The pilot signals may each include a training sequence, and the pilot signals received at the plurality of antennas of the base station are analyzed by the base station logic. Information about a radio channel property of the radio channel between the terminal device and the plurality of antennas may be obtained as a result of this analysis. A base station may use the results of the analysis to determine configuration parameters for transmitting signals via the antennas to the respective terminal devices and for receiving signals via the antennas from the respective terminal devices. For example, based on the received uplink pilot signal, receive configuration parameters may be obtained and transmit configuration parameters may be obtained based on reciprocity.

As the wireless radio channel property of the wireless channel between the terminal device and the base station may vary with time, the pilot signaling has to be repeated after a so-called coherence time, which indicates the time duration over which the channel property is considered to be not varying. Likewise, as the transmission of payload data may use large frequency ranges, for each coherence bandwidth of a payload data transmission a corresponding pilot signal may be provided for analyzing the channel properties within the coherence bandwidth. The coherence bandwidth is a statistical measurement of a range of frequencies over which the channel is considered to be "flat", or in other words the approximate maximum bandwidth over which two frequencies of a signal are likely to experience comparable or correlated amplitude fading.

To sum up, (massive) MIMO may be advantageous in terms of spectral efficiency. It enables multiple users to simultaneously use the same time and frequency resources. However, performance may be limited by a coherence block size (this is the combination of coherence time and coherence bandwidth) as each coherence block needs a pilot signal for each stream. Nevertheless, under certain conditions, for example a static environment, no or very little mobility and rich scattering, a large number of terminal devices, for example in the order of 20 terminal devices, may use the same resources in a spatial multiplexed manner using MIMO technologies. The terminal devices may be grouped and the different groups are time and/or frequency multiplexed. The base station may then schedule terminal devices with orthogonal spatial channels in the same group and such the throughput on a cell level may be increased. However, the pilot signals are scarce resources as they need to be orthogonal in time and/or frequency domain and hence become overhead that may limit the spectral efficiency. In general, orthogonality in the spatial domain may alternatively or additionally comprise that devices are grouped based on power level as seen from the base station.

SUMMARY OF THE INVENTION

In view of the above, there is a need in the art for enhancing multiple-input and multiple-output, MIMO, systems, in particular massive MIMO systems, to use resources for a pilot signaling more efficiently.

According to the present invention, this object is achieved by the features of the independent claims. The dependent claims define embodiments of the invention.

In the following description, the term "radio resource" will be used. With regard to LTE technologies a radio resource may relate to at least one resource block and is therefore characterized by its time slot(s) and the frequency ranges of its subcarriers. In particular, with regard to LTE technologies and according to the present invention, a radio resource may relate to a plurality of resource blocks within a predetermined coherence bandwidth and/or coherence time. For example, the plurality of resource blocks may comprise the resource blocks within a frame or some subsequent frames and within a predetermined frequency range (for example within a coherence bandwidth in the range of 1 to 5 MHz).

According to the present invention, a method for operating a terminal device of a cellular wireless multiple-input and multiple-output, MIMO, system is provided. The terminal device may comprise for example a mobile telephone, in particular a so-called smart phone, a Tablet PC or an Internet of Things (IoT) device. The cellular wireless MIMO system may comprise for example a Long Term Evolution (LTE) system. According to the method, an uplink precoding for transmitting and precoding uplink signals from a plurality of antenna elements of the terminal device to a base station of the MIMO system is determined. The uplink precoding is assigned to a radio resource of a transmission frame of the MIMO system. Precoding may comprise for example that an uplink radio signal is transmitted from each of the antenna elements of the terminal device with an appropriate weighting (phase and gain), and is received at a plurality of antenna elements of the base station such that a current radio channel state is considered and the communication is optimized, for example in terms of throughput and signal quality. However, the uplink precoding is valid for a certain coherence bandwidth only and is therefore assigned to a radio resource within this coherence bandwidth. The uplink signals may comprise for example data in LTE resource blocks within one frame or a stream of data in LTE resource blocks in consecutively transmitted frames. Further, according to the method, an uplink pilot signal assigned to the radio resource is transmitted from the plurality of antenna elements using the uplink precoding.

When a same resource is used by a plurality of spatially multiplexed terminal devices, the transmission of precoded uplink pilot signals from the terminal devices to the base station may be performed simultaneously from the plurality of terminal devices without affecting each other. This may enable the base station to adjust its receive parameters and downlink precodings to the corresponding terminal devices more frequently without significantly increasing the amount of required transmission capacity for pilot signal transmission.

The transmission of the precoded uplink pilot signals from the terminal devices and the adjustment of receive and transmit parameters of the base station based thereon may be performed on a regular base. As the uplink pilot signals are precoded, the uplink pilot signals from different terminal devices do not influence each other and intervals for adjusting the receive and transmit parameters of the base station may be short, for example in a range of 0.5 to 10 ms, in particular for example 1 ms. Thus, coherency and a corresponding MIMO gain may be maintained for each communication channel between the base station and the corresponding terminal device without influencing other terminal devices of the same group or of other groups.

According to an embodiment, a further uplink precoding assigned to the radio resource is determined. The further uplink precoding is different from the uplink precoding described above. From the plurality of antenna elements a further uplink pilot signal assigned to the radio resource is transmitted using the further uplink precoding. For example, the same resource may be used for communicating two data streams between the base station and the terminal device using spatial multiplexing (MIMO rank 2), for example in rich scattering environments. The uplink pilot signal precoded with the uplink precoding and a further uplink pilot signal precoded with the further uplink precoding are transmitted from the plurality of antenna elements at the same time or in the same time/frequency resource. Due to the different precoding, also in this configuration the transmission of precoded uplink pilot signals for each data stream may be performed simultaneously from the terminal device without affecting each other. This may enable the base station to adjust its receive parameters and downlink precodings for both streams to the terminal device more frequently without significantly increasing the amount of required transmission capacity for pilot signal transmission.

Although the method described above only defines two uplink precodings and two pilot signals assigned to the same radio resource, the above-described method may be extended to more than two different uplink precodings for precoding and transmitting more than two uplink pilot signals. Thus, the terminal device may use the same radio resource more than two times using spatial multiplexing (MIMO rank 3 or higher)

For increasing the legibility of the following embodiment, the uplink precoding is named "first uplink precoding", the radio resource is named "first radio resource", and the uplink pilot signal is named "first uplink pilot signal". Further, according to this embodiment, a second uplink precoding assigned to a second radio resource of the transmission frame of the MIMO system is determined for transmitting uplink signals from the plurality of antenna elements of the terminal device to the base station of the MIMO system. A second uplink pilot signal assigned to the second radio resource is transmitted from the plurality of antenna elements using the second uplink precoding.

Within a cell of the MIMO system, the different terminal devices may be grouped and served in different time and/or frequency resources based on a limited spatial separation. Group allocation may depend on the number of terminal devices and the spatial orthogonality between the terminal devices. With the above described embodiment, a terminal device may belong to more than one group. The precoded transmission of the first uplink pilot signal may optimize its spatial orthogonality with respect to one group and the second uplink pilot signal with respect to another group to which the terminal device belongs. The first radio resource may be assigned to the first group of spatially multiplexed terminal devices operated in the MIMO system and the second radio resource may be assigned to the second group of spatially multiplexed terminal devices operated in the MIMO system.

Although the method described above only defines first and second uplink precodings and first and second uplink pilot signals, the above-described method may be extended to more than two different uplink precodings for precoding and transmitting more than two uplink pilot signals. Thus, the terminal device may belong to more than two groups, for example three to ten groups or any other number of groups.

In other words, the present invention relates to a method for operating a terminal device of the cellular wireless multiple-input and multiple-output, MIMO, system, in which at least a first uplink precoding and a second uplink precoding for transmitting uplink signals from a plurality of antenna elements of the terminal device to a base station of the MIMO system are determined. A first uplink pilot signal using the first uplink precoding and being assigned to a first uplink radio resource is transmitted from the plurality of antenna elements, wherein the first uplink radio resource is allocated to a first group of spatially multiplexed terminal devices operated in the MIMO system. A second uplink pilot signal using the second uplink precoding and being assigned to a second uplink radio resource is transmitted from the plurality of antenna elements, wherein the second uplink radio resource may be different from the first uplink radio resource and is allocated to a second group of spatially multiplexed terminal devices operated in the MIMO system.

The precoding may comprise a definition of a phase and gain or amplitude for each antenna element of the plurality of antenna elements of the terminal device. The phase and gain or amplitude are used when transmitting the uplink signal, in particular the uplink pilot signal, via the corresponding antenna element. As such, the precoded uplink pilot signal may be considered as an uplink pilot signal vector associated to the precoding and the resource assigned to the group of spatially multiplexed terminal devices to which the terminal device belongs.

According to another embodiment, the terminal device transmits from each individual antenna element of the plurality of antenna elements of the terminal device a corresponding raw uplink pilot signal on a dedicated time/frequency resource. For example, the terminal device may transmit subsequently from each individual antenna element of the plurality of antenna elements of the terminal device a corresponding raw uplink pilot signal. In other words, an uplink pilot signal is sent without precoding (no precoding means a "raw" uplink pilot signal) subsequently from each of the antenna elements of the plurality of antenna elements of the terminal device. For example, the uplink pilot signal is first sent from a first antenna element of the plurality of antenna elements while the remaining antenna elements of the plurality of antenna elements are silent. Subsequently, the uplink pilot signal is sent from a second antenna element of the plurality of antenna elements while the remaining antenna elements of the plurality of antenna elements are silent. This is continued until the uplink pilot signal is sent from the last antenna element of the plurality of antenna elements while the remaining antenna elements of the plurality of antenna elements are silent. Additionally or as an alternative, the plurality of raw uplink pilot signals may be transmitted in a frequency multiplexed manner from the plurality of antenna elements of the terminal device. For example, a first raw uplink pilot signal is transmitted from the first antenna element using a first frequency range, a second raw uplink pilot signal is transmitted from the second antenna element using a second frequency range, and so on. The first, second and further frequency ranges are different from each other.

The base station may estimate channel characteristics of the radio channel between the base station and the terminal device based on receive properties of the raw uplink pilot signals. Based on the channel characteristics, the base station may determine a downlink precoding and uplink receive parameters to be used by the base station for communicating signals between the base station and the terminal device using the radio resource.

For example, the base station may compute a Hermitian conjugate based on the receive properties of the raw pilot signals received at the plurality of antenna elements of the base station to determine a delay (phase) and an amplitude (gain) for each antenna element of the base station when transmitting downlink signals (precoding) and/or receiving uplink signals.

Furthermore, the base station may determine uplink precoding information assigned to the radio resource, which may be appropriate for precoding uplink signals from the terminal device to the base station via the radio resource. The base station may determine the uplink precoding information based on the receive properties of the received raw uplink pilot signals transmitted by the terminal device. The uplink precoding information may be transmitted from the base station to the terminal device. For example, the base station may determine an appropriate uplink precoding from a predefined set of uplink precodings and may transmit a reference to the appropriate uplink precoding. Additionally or as an alternative, the base station may determine an appropriate uplink precoding in terms of phase and gain or amplitude for each antenna element of the terminal device and may transmit this information to the terminal device. As an alternative, the base station may transmit a downlink pilot signal using the downlink precoding.

The terminal device receives the uplink precoding information assigned to the radio resource from the base station and determines the uplink precoding based on the uplink precoding information. For example, the terminal device may select the uplink precoding from a predefined set of uplink precodings as indicated in the uplink precoding information. As an alternative, the terminal device may use the phase and gain or amplitude as indicated for each antenna element in the uplink precoding information as the uplink precoding. Further, the terminal device may determine an appropriate uplink precoding based on receive properties of the downlink pilot signal. For example, the terminal device may compute a Hermitian conjugate based on the downlink pilot signal received at the plurality of antenna elements of the terminal device to determine a delay (phase) and an amplitude (gain) for each antenna element of the terminal device when transmitting uplink signals The raw pilot signals may be used by the base station to assign the radio resources to the terminal devices and to form the spatially multiplexed groups. The above described embodiment may be used to set up the downlink precoding initially, for example after the base station has assigned the terminal devices operated in the MIMO system to the spatially multiplexed groups and after the base station has assigned the radio resources to the terminal devices based on the raw pilot signals.

According to a further embodiment, in response to transmitting from each individual antenna element the raw uplink pilot signals, further uplink precoding information is received from the base station at the terminal device. The further uplink precoding information is assigned to the same radio resource, but is different from the uplink precoding information. In other words, according to this embodiment, the same radio resource is used in a MIMO rank 2 configuration between the base station and the terminal device. Higher rank configurations may be accomplished by extending the method in the same way with yet a further uplink precoding information, which is different from the further uplink precoding information and the uplink precoding information.

In detail, the base station may estimate channel properties of the radio channel between the base station and the terminal device based on receive properties of the raw uplink pilot signals. Based on the channel properties, the base station may determine a further downlink precoding and further uplink receive parameters for communicating signals between the base station and the terminal device using the radio resource. Thus, using the spatial multiplexing, the same radio resource may be used for communicating two data streams between the base station and the terminal device.

Furthermore, the base station may determine further uplink precoding information assigned to the radio resource, which may be appropriate for precoding uplink signals from the terminal device to the base station via the radio resource. The base station may determine the further uplink precoding information based on the receive properties of the received raw uplink pilot signals. The further uplink precoding information may be transmitted from the base station to the terminal device. For example, the base station may determine an appropriate further uplink precoding from a predefined set of uplink precodings and may transmit a reference to the appropriate uplink precoding. Additionally or as an alternative, the base station may determine the appropriate further uplink precoding in terms of phase and gain or amplitude for each antenna element of the terminal device and may transmit this information to the terminal device. As an alternative, the base station may transmit a downlink pilot signal using the further downlink precoding.

The terminal device receives the further uplink precoding information assigned to the radio resource from the base station and determines the further uplink precoding based on the further uplink precoding information. For example, the terminal device may select the further uplink precoding from a predefined set of uplink precodings as indicated in the further uplink precoding information. As an alternative, the terminal device may use the phase and gain or amplitude as indicated for each antenna element in the further uplink precoding information as the further uplink precoding. Further, the terminal device may determine an appropriate further uplink precoding based on receive properties of the further downlink pilot signal.

The above-described embodiment may be used to set up the further downlink precoding initially.

According to a further embodiment, in response to transmitting from each individual antenna element the raw uplink pilot signals, second uplink precoding information is received from the base station at the terminal device. The second uplink precoding information is assigned to a second radio resource, which is different from the above mentioned radio resource, which is considered in this embodiment as a "first" resource. In other words, according to this embodiment, the same terminal device is using two radio resources and may therefore be assigned to two groups of spatially multiplexed terminal devices. An assignment of the same terminal device to more than two groups may be accomplished by extending the method in the same way with third or even more uplink precoding information assigned to a third or higher radio resource, which is different from the first and second radio resources.

The base station may estimate channel properties of the radio channel between the base station and the terminal device based on receive properties of the raw uplink pilot signals. Based on the channel characteristics, the base station may determine a second downlink precoding and second uplink receive parameters for communicating signals between the base station and the terminal device using the second radio resource.

Furthermore, the base station may determine second uplink precoding information assigned to the second radio resource, which may be appropriate for precoding uplink signals from the terminal device to the base station via the second radio resource. The base station may determine the second uplink precoding information based on the receive properties of the received raw uplink pilot signals, which were transmitted from the terminal device. The second uplink precoding information may be transmitted from the base station to the terminal device. For example, the base station may determine an appropriate second uplink precoding from a predefined set of uplink precodings and may transmit a reference to the appropriate second uplink precoding. Additionally or as an alternative, the base station may determine an appropriate second uplink precoding in terms of phase and gain or amplitude for each antenna element of the terminal device and may transmit this information to the terminal device. As an alternative, the base station may transmit a second downlink pilot signal using the second downlink precoding.

The terminal device receives the second uplink precoding information assigned to the second radio resource from the base station and determines the second uplink precoding based on the second uplink precoding information. For example, the terminal device may select the second uplink precoding from a predefined set of uplink precodings as indicated in the second uplink precoding information. As an alternative, the terminal device may use the phase and gain or amplitude as indicated for each antenna element in the second uplink precoding information as the second uplink precoding. Further, the terminal device may determine an appropriate second uplink precoding based on receive properties of the second downlink pilot signal.

The above-described embodiment may be used to set up the second downlink precoding initially.

Transmission of the raw pilot signals and setting up corresponding receive and transmission parameters at the base station and the terminal devices may be performed on a regular base. As the raw pilot signals needs to be orthogonal, resources for transmitting these raw pilot signals are scars, and therefore the transmission of the raw pilot signals may be performed in long intervals only, for example every second or every few seconds.

Furthermore, according to the present invention, a method for operating a base station of a cellular wireless multiple-input and multiple-output, MIMO, system is provided. The base station comprises a plurality of antenna elements. According to the method, a downlink precoding and uplink receive parameters for communicating signals between the plurality of antenna elements of the base station and a terminal device using a radio resource of a transmission frame of the MIMO system are determined. At the plurality of antennas of the base station, an uplink pilot signal assigned to the radio resource is received. The uplink pilot signal is transmitted from the terminal device using an uplink precoding. Based on a receive property of the uplink pilot signal, the downlink precoding and the uplink receive parameters are adjusted. For example, the base station may compute a Hermitian conjugate based on the received uplink pilot signal to determine a time delay (phase) and amplitude for each antenna element of the plurality of antenna elements of the base station to focus radio energy in a sector in which the terminal device is located. Likewise, receive parameters for enabling a directed receive characteristic with respect to the terminal device may be computed by the base station based on the received uplink pilot signal.

By using precoded uplink pilot signals, the resources for transmitting uplink pilots may be used simultaneously by a plurality of terminal devices communicating with the base station. As the same resource may be used simultaneously by the plurality of terminal devices using spatial multiplexing, the uplink pilot signals may be transmitted more frequently, for example every millisecond, such that the downlink precoding and the uplink receive parameters of the base station may be adjusted more frequently. This enables the base station to maintain a high MIMO gain and transmission quality.

According to an embodiment, a further downlink precoding and further uplink receive parameters for communicating signals between the plurality of antenna element of the base station and the terminal device using the radio resource of the transmission frame of the MIMO system are determined. The above-mentioned downlink precoding and the further downlink precoding are different. Likewise, the above-mentioned uplink receive parameters and the further uplink receive parameters are different. In other words, a MIMO rank 2 communication is established between the base station and the terminal device using the same radio resource. At the plurality of antennas of the base station, a further uplink pilot signal assigned to the radio resource is received using the further uplink receive parameters. The further uplink pilot signal is transmitted from the terminal device using a further uplink precoding which is different from the uplink precoding. The further downlink precoding and the further uplink receive parameters of the base station are adjusted based on a receive property of the further uplink pilot signal.

In this MIMO rank 2 configuration, the uplink pilot signals are transmitted as precoded uplink pilot signals such that they do not influence each other. This may enable to transmit these uplink pilot signals more frequently to maintain a desired MIMO gain. This embodiment is not limited to a MIMO rank 2 configuration, but maybe extended in the same way to a MIMO rank 3 or higher configuration.

In the following embodiment, the above mentioned downlink precoding is called first downlink precoding, the above mentioned uplink receive parameters are called first uplink receive parameters, the above-mentioned radio resource is called first radio resource, the above-mentioned uplink pilot signal is called first uplink pilot signal, and the above-mentioned uplink precoding is called first uplink precoding. According to this embodiment, a second downlink precoding and second uplink receive parameters for communicating signals between the plurality of antenna elements of the base station and the terminal device using a second radio resource of the transmission frame of the MIMO system are determined. At the plurality of antenna elements of the base station, a second uplink pilot signal assigned to the second radio resource is received. The second uplink pilot signal is transmitted from the terminal device using a second uplink precoding. The second downlink precoding and the second uplink receive parameters are adjusted based on a receive property of the second uplink pilot signal.

In this embodiment, the terminal device is assigned to two MIMO groups using to different radio resources, the first radio resource and the second radio resource. In each group, the uplink pilot signals may be transmitted as precoded uplink pilot signals from the respective terminal devices to the base station such that they do not influence each other. This allows to transmit the uplink pilot signals more frequently, for example every millisecond, and the base station may adjust and/or adapt its receive and transmit parameters more frequently to maintain a high MIMO gain.

According to another embodiment, the base station receives raw uplink pilot signals. The raw uplink pilot signals are transmitted for example subsequently or frequency multiplexed from each individual antenna element of the plurality of antenna elements of the terminal device. The downlink precoding and uplink receive parameters for communicating signals between the plurality of antenna elements of the base station and the terminal device using a radio resource is determined based on a plurality of receive properties of the received plurality of raw uplink pilot signals. The raw uplink pilot signals are transmitted without precoding from the terminal device. This allows a very precise channel sounding of the radio channel between the base station and the terminal device. This may enable the base station to establish an initial configuration of its downlink precoding and uplink receive parameters. Furthermore, the base station may group the terminal devices into MIMO groups based on the raw uplink pilot signals received from the terminal devices and the base station may assign radio resources to each group. Furthermore, uplink precoding information assigned to the radio resource is determined based on the plurality of receive properties of the received plurality of raw uplink pilot signals. In other words, the base station may not only determine receive and transmit parameters for its own antenna elements, but also for the antenna elements of the terminal device. The uplink precoding information is transmitted from the base station to the terminal device.

According to another embodiment, the further downlink precoding and the further uplink receive parameters for communicating signals between the plurality of antenna elements of the base station and the terminal device using the radio resource are determined based on the plurality of receive properties of the received plurality of raw uplink pilot signals. Again, the raw pilot signals allow a very precise channel sounding such that a configuration of the further downlink precoding and the further uplink receive parameters of a MIMO rank 2 or higher configuration may be determined. Additionally, further uplink precoding information assigned to the radio resource is determined based on the plurality of receive properties of the received raw uplink pilot signals. Based on the raw uplink pilot signals, the base station may not only determine its own antenna configuration, but also an appropriate antenna configuration for the terminal device in the MIMO rank 2 or higher configuration. The further uplink precoding information is transmitted from the base station to the terminal device. The terminal device may configure its antenna elements as defined in the further uplink precoding information.

In this embodiment, also the second downlink precoding and the second uplink receive parameters for communicating signals between the plurality of antenna elements of the base station and the terminal device using the second radio resource are determined based on the plurality of receive properties of the received plurality of raw uplink pilot signals. Furthermore, second uplink precoding information assigned to the second radio resource is determined based on the plurality of receive properties of the received plurality of raw uplink pilot signals. The second uplink precoding information is transmitted to the terminal device. Thus, an initial configuration of the uplink and downlink precoding is as well as the uplink and downlink receive parameters in the base station and the terminal device may be determined based on the raw pilot signals for each MIMO group. Furthermore, a grouping and a resource assignment may by additionally performed by the base station based on the raw uplink pilot signals.

Channel sounding with the raw uplink pilot signals may be performed in regular intervals, for example every second or every few seconds. Additionally or as an alternative, the channel sounding using the raw uplink pilot signals may be triggered based on quality measurements to maintain coherence of the MIMO communication.

According to another embodiment, payload and/or control data is communicated in uplink and downlink directions between the base station and the terminal device in each MIMO group using the corresponding radio resources and the precoding as well as the receive parameters.

According to the present invention, furthermore a terminal device for a cellular multiple-input and multiple-output, MIMO, system is provided. The terminal device comprises a plurality of antenna elements and a logic. The logic may comprise for example a control logic based on a microprocessor or a digital signal processor in combination with a computer program. The logic is configured to determine an uplink precoding assigned to a radio resource of the transmission frame of the MIMO system for transmitting uplink signals from the plurality of antenna elements to a base station of the MIMO system. The logic is furthermore configured to transmit an uplink pilot signal assigned to the radio resource using the uplink precoding via the plurality of antenna elements.

The terminal device may be configured to perform the above-described method and the embodiments thereof. Thus, the terminal device may be operated simultaneously in two groups of spatially multiplexed terminal devices operated within a cell of the MIMO system or may be operated in a MIMO rank 2 or higher configuration. The terminal device may be operated in three or more groups of spatially multiplexed terminal devices. For example, for operating the terminal device in a third group of spatially multiplexed terminal devices, the terminal device may determine furthermore a third uplink precoding and may transmit a third uplink pilot signal from the plurality of antenna elements using the third uplink precoding assigned to a third uplink radio resource of the transmission frame, which is assigned to the third group of spatially multiplexed terminal devices.

Furthermore, according to the present invention, a base station for a cellular wireless multiple-input and multiple-output, MIMO, system is provided. The base station comprises a plurality of antenna elements and a logic, for example a control logic or a processor and a control program. The logic is configured to determine a downlink precoding and uplink receive parameters for communicating signals between the plurality of antenna elements and the terminal device using a radio resource of a transmission frame of the MIMO system. Furthermore, the logic is configured to receive, at the plurality of antenna elements, an uplink pilot signal assigned to the radio resource. The uplink pilot signal is transmitted from the terminal device using an uplink precoding. Furthermore, the logic is configured to adjust the downlink precoding and the uplink receive parameters based on a receive property of the uplink pilot signal. The base station may be configured to perform the above-described method and the embodiments thereof.

The base station of the cellular MIMO system may be configured to communicate according to the so-called Long Term Evolution (LTE) cellular communication network standard. The terminal device may comprise a mobile telephone. Additionally or as an alternative, the base station of the cellular MIMO system may be configured for a communication in a wireless local area network (WLAN), for example according to the IEEE 802.11 standards. Massive MIMO may also be supported by the base station in for example WLAN environments. Additionally or as an alternative, the base station may act as coordinated access point (AP) in for example an office building or an airport.

In the various embodiments, the MIMO system may be a massive MIMO system. The base station may include more than ten antenna elements, for example several tens of antenna elements, to transmit and receive signals. The base station may include more than one hundred antenna elements for receiving and transmitting signals. Furthermore, the base station antenna elements may be distributed. The plurality of antenna elements may comprise several subsets located at several locations remote from another. The several subsets may interact with each other in a cooperative MIMO manner.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

Embodiments of the invention will be described in more detail with reference to the accompanying drawings.

DETAILED DESCRIPTION OF THE EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise.

Figure 1:
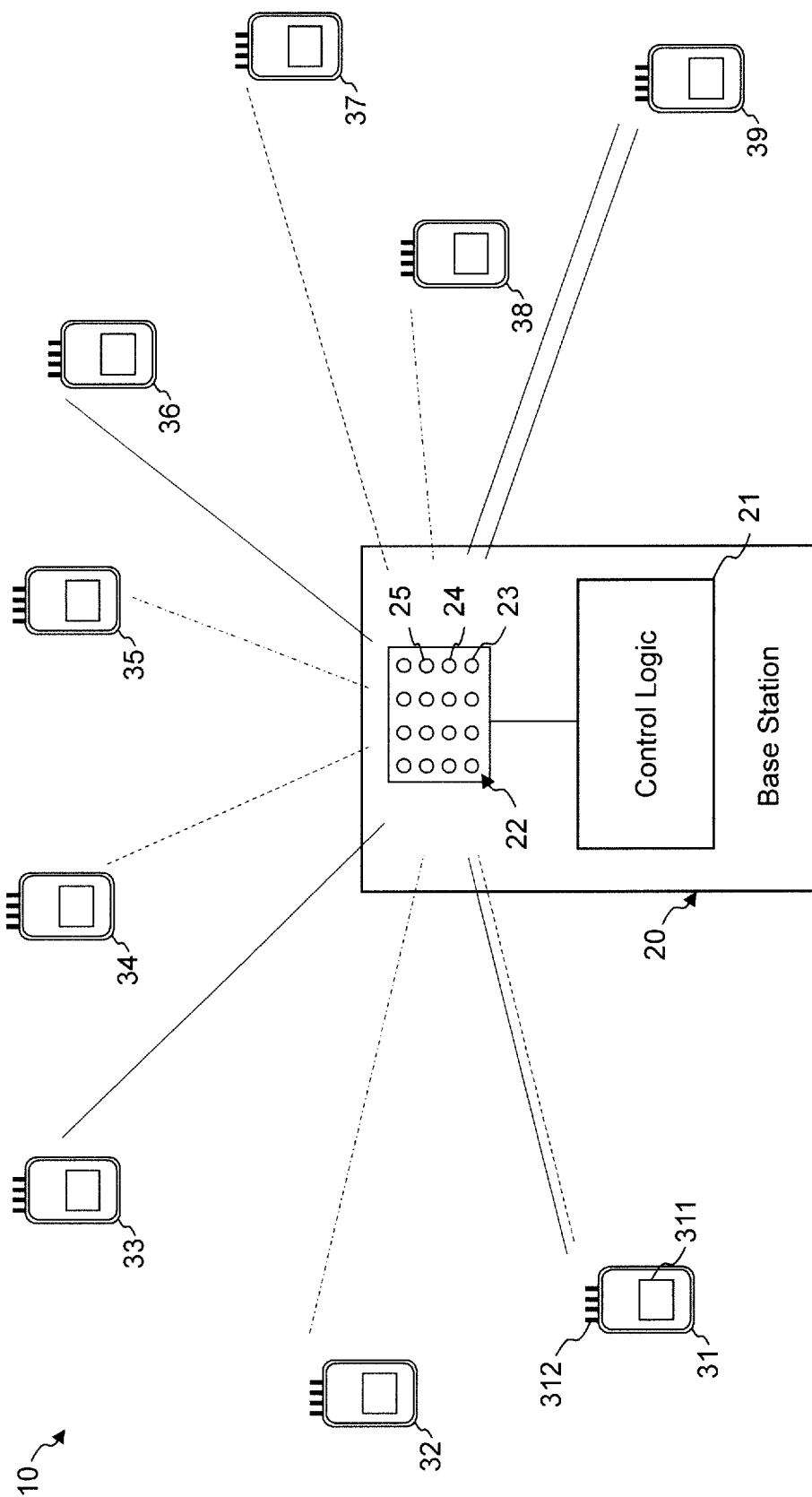
FIG. 1 shows schematically a MIMO system comprising a base station and a plurality of terminal devices according to embodiments of the present invention.

FIG. 1 shows schematically a cellular wireless multiple-input and multiple-output (MIMO) system 10 comprising a base station 20 and a plurality of terminal devices 31 to 39. The base station 20 comprises an antenna array 22 including a plurality of antenna elements, of which three are indicated by reference signs 23 to 25. The base station 20 may have a large number of antenna elements 23 to 25, such as several tens or in excess of one hundred antenna elements. The antenna elements 23 to 25 may be arranged in a two- or three-dimensional spatial array on a carrier. The base station 20 also comprises associated transceivers for the antenna elements 23 to 25. The plurality of antenna elements may also be spatially distributed to various locations, for example in cooperative MIMO. It is also possible that several base stations interact in cooperative MIMO, with the plurality of antenna elements being distributed over various locations.

The base station 20 is configured to analyze a pilot signal received from a terminal device at the plurality of antenna elements 23 to 25 to determine channel characteristics for a radio signal transmission between the plurality of antenna elements 23 to 25 and the terminal device. For illustration, a control logic 21 of the base station 20 may be configured to determine a footprint matrix based on a pilot signal received by the plurality of antenna elements 23 to 25 from a terminal device. The logic 21 may use the footprint matrix to control the plurality of antenna elements 23 to 25 when transmitting radio signals to the terminal device. The logic 21 may compute a Hermitian conjugate of the footprint matrix to determine time delays and amplitudes of radio signals transmitted by each of the plurality of antenna elements 23 to 25 to focus radio energy in a sector in which the terminal device is located. The control may be performed in such a way that focusing of radio energy is not only performed as a function of the direction, but also as a function of distance from the base station 20. A radio signal transmitted by the plurality of antenna elements 23 to 25 in the above-described manner with individually assigned delays and amplitudes to each antenna is called a "precoded" radio signal. This precoding enables the base station 20 to communicate with multiple terminal devices simultaneously using the same time and frequency resources, as the multiple terminal devices are addressed by a spatial multiplexing.

The terminal devices 31 to 39 shown in FIG. 1 also comprise each a plurality of antenna elements. As an example, each terminal device 31 to 39 may comprise four antenna elements, which are indicated at the exemplary terminal device 31 with reference sign 312. As described above in connection with the base station 20, each terminal device 31 to 39 may comprise transceivers and a control logic 311 to provide a precoding when transmitting radio signals by the plurality of antenna elements 312. The precoding may assign to each antenna element 312 a corresponding individual delay (phase) and amplitude (gain).

Further, FIG. 1 shows an arrangement of the terminal devices 31 to 39 in an environment of the base station 20. Due to the spatial arrangement, the terminal devices 32, 35 and 38 may communicate simultaneously with the base station 20 using the same time and frequency resources and the spatial multiplexing. The resource may comprise for example one specific time and frequency resource of a predefined set of resources defined in a cell of the MIMO system 10. For example, the resource may be defined in a frame of the MIMO system, for example a resource block defined in a frequency division duplexing (FDD) LTE frame or in a time division duplexing (TDD) LTE frame in a cell of an LTE system. Likewise, the terminal devices 33, 36 and 39 may communicate simultaneously with the base station 20 using a further same time and frequency resource and the spatial multiplexing. The resource used by the terminal devices 32, 35 and 38 is indicated in FIG. 1 by the dash and dot line, and the resource used by the terminal devices 33, 36 and 39 is indicated in FIG. 1 by a solid line. As such, the terminal devices may be grouped and the different groups are time and/or frequency multiplexed. One group may comprise terminal devices 32, 35 and 38, whereas another group may comprise terminal devices 33, 36 and 39. The base station 20 may then schedule terminal devices with orthogonal spatial channels within the same group. On a cell level, the throughput of data may increase. A further group may comprise terminal devices 34 and 37 and may utilize a further common (same) resource (indicated by a dashed line in FIG. 1) and the spatial multiplexing.

Additionally, the same resource may be used twice or even more by a single terminal device using spatial multiplexing such that two or more data streams may be established simultaneously between the base station 20 and a terminal device using the same resource. Such configurations are known as MIMO rank 2 (or higher). In FIG. 1, such an example is shown in connection with terminal device 39, which has two data streams in a MIMO rank 2 configuration.

However, when multiple terminal devices simultaneously use the same time and frequency resources by spatial multiplexing, the performance is limited by the coherence time and coherency bandwidth as each coherency block needs a pilot signal. The pilot signals need to be orthogonal so that they can be clearly assigned to a certain stream of a certain terminal device and do not interfere with each other. Group allocation depends on the number of terminal devices and the spatial orthogonality between them. Terminal devices with multiple antenna elements, for example the terminal devices 31 to 39 shown in FIG. 1, may transmit pilot signals using a precoding to optimize spatial orthogonality with respect to other terminal devices of a group. Furthermore, a differently precoded pilot signal may be used to optimize spatial orthogonality with respect to other terminal devices of another group. This enables a terminal device to belong to more than one group. In the example shown in FIG. 1, the terminal device 31 uses this mechanism to participate in two groups, namely the group comprising additionally terminal devices 34 and 37 and the group comprising additionally terminal devices 33, 36 and 39.

Figure 2:
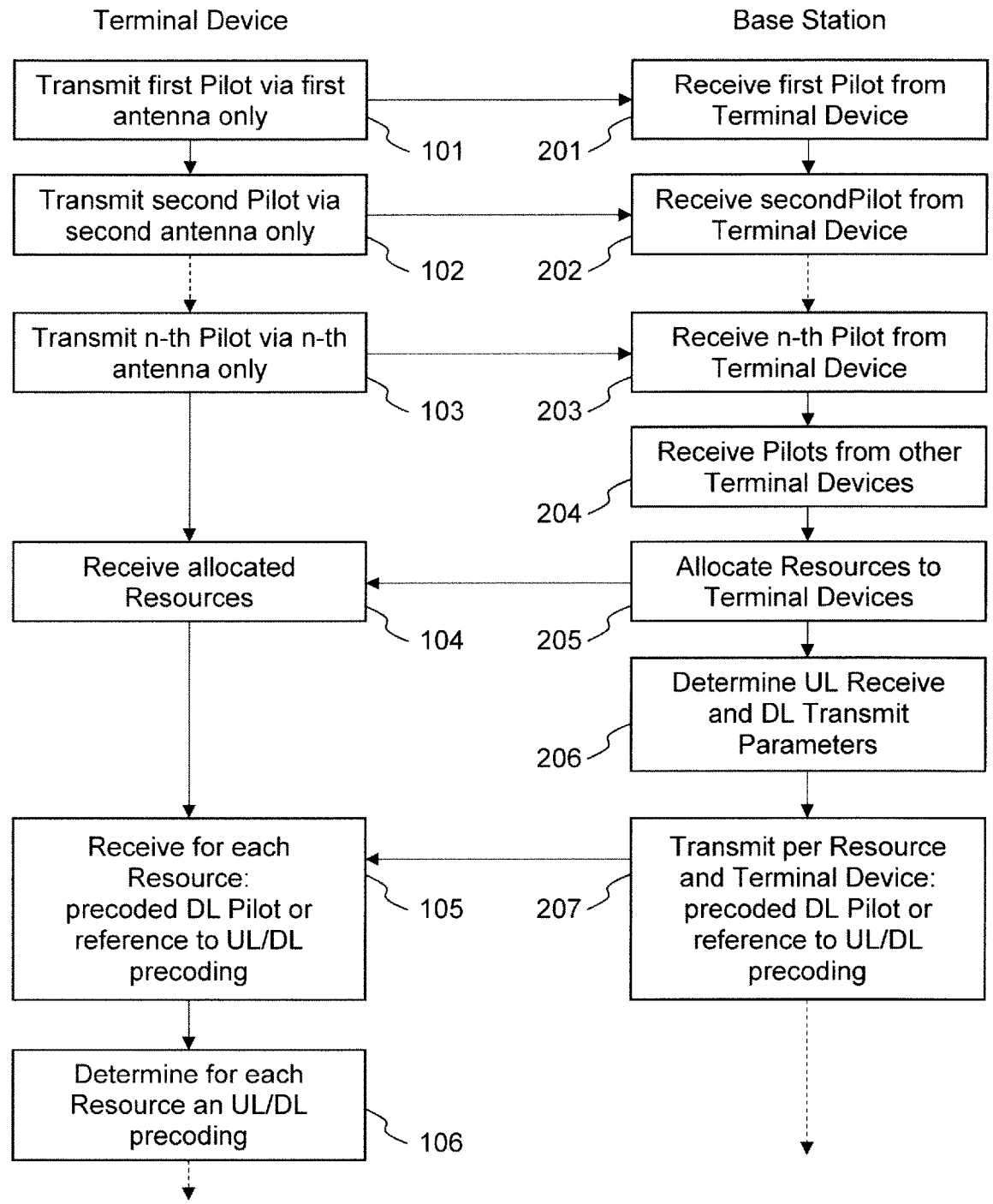
FIGS. 2 and 3 show schematically flowcharts of methods performed by a base station and a terminal device according to embodiments of the present invention.
Figure 3:
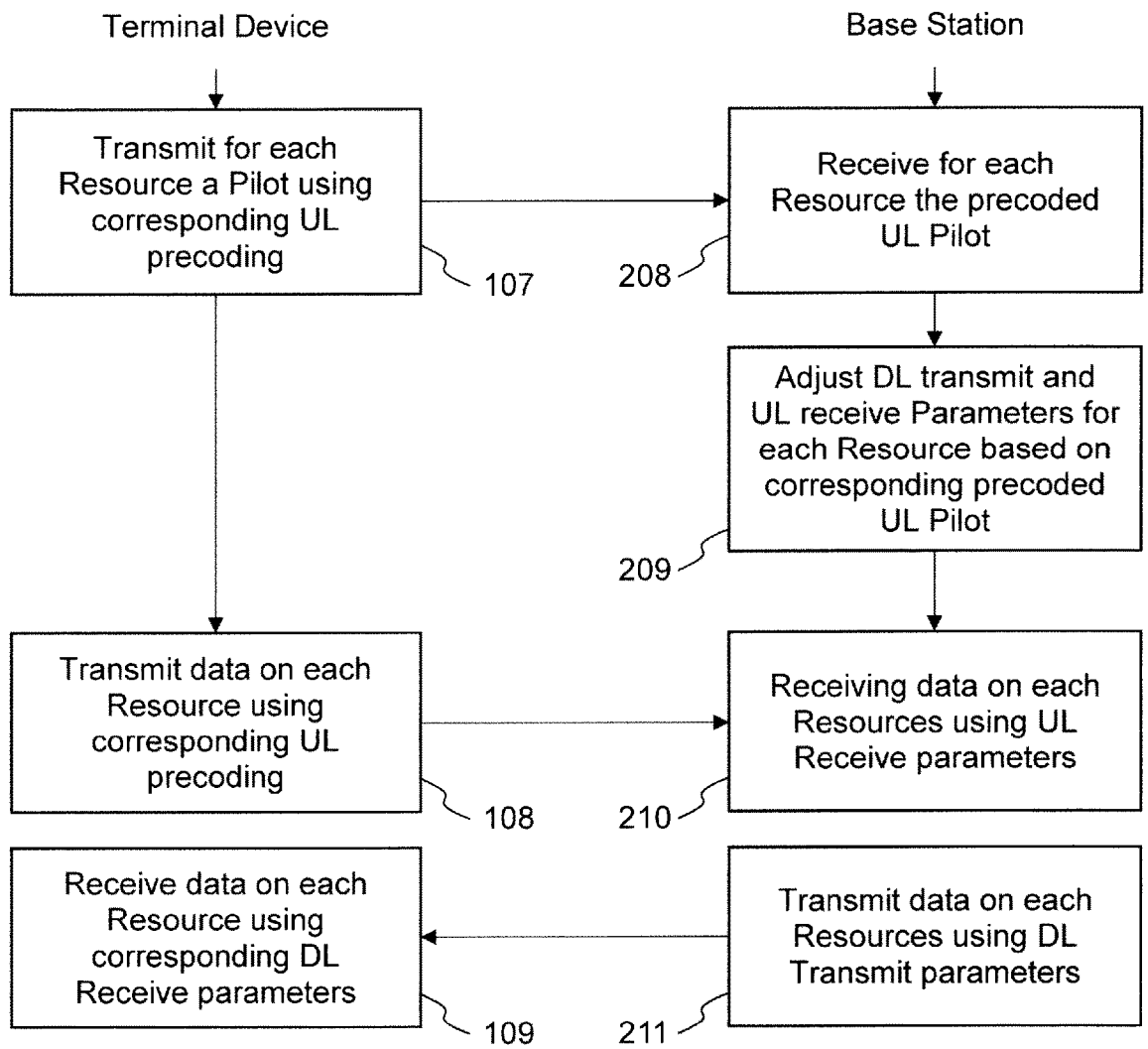

For accomplishing this in an exemplary embodiment, terminal device 31 may perform steps 101 to 109 and the base station 20 may perform steps 201 to 211 shown in FIGS. 2 and 3. The terminal device 32 to 39 may perform these method steps as well. The described methods of FIGS. 2 and 3 may be summarized as follows. In steps 101 to 106 and 201 to 207 an initial determination of precoding parameters for transmitting uplink and downlink signals is described. This initial determination uses the transmission of uplink pilot signals with no precoding. After this, the downlink precoding and uplink receive parameters at the base station 20 are continuously adapted in steps 107 to 109 and 208 to 211 based on a transmission of precoded uplink pilot signals from the terminal device 31. The adaption of the downlink precoding and uplink receive parameters (steps 107 to 109 and 208 to 211) may be performed on a regular base, for example based on the coherence time and coherence bandwidth or based on quality parameters. The adaption of the downlink precoding and uplink receive parameters may be performed for example regularly in intervals in a range of for example 1 ms to 100 ms. The initial determination of the precodings and receive parameters in uplink and downlink direction may be performed regularly in larger intervals than the adaption of the downlink precoding and uplink receive parameters. For example, the initial determination of the precoding and receive parameters in uplink and downlink direction may be performed once after 10 to 1000 adaptions of the downlink precoding and uplink receive parameters have been performed, for example every second.

The initial determination of the precoding parameters starts with transmitting subsequently from each individual antenna element of the plurality of antenna elements of the terminal device 31 an uplink pilot signal, using for example a resource which is assigned to the first group of terminal devices comprising the terminal devices 31, 33, 36 and 39 or which is at least within a coherence bandwidth of this radio resource in case the terminal device 31 wants to participate in this group. In detail, in step 101 a pilot signal is transmitted via only a first antenna element of the plurality of antenna elements of the terminal device 31. In other words, while the pilot signal is transmitted via the first antenna element, the other antenna elements of the terminal device 31 are silent. Next, in step 102 the pilot signal is transmitted via only a second antenna element of the plurality of antenna elements of the terminal device 31, while the other antenna elements of the terminal device 31 are silent. This is repeated for each antenna element of the plurality of antenna elements of the terminal device 31. In the example of the terminal device 31 shown in FIG. 1, this is repeated four times for each of the four antenna elements 312 of the terminal device 31. Thus, in step 103 the pilot signal is transmitted via only the fourth antenna element of the terminal device 31. Pilot signals transmitted individually from single antenna elements (i.e. without precoding) are also called "raw" pilot signals. As an alternative, the raw pilot signals may be transmitted in a frequency multiplexed manner from the plurality of antenna elements, wherein different frequencies or frequency ranges are used by the antenna elements for transmitting their corresponding pilot signals.

In the base station 20, the raw uplink pilot signals transmitted subsequently in steps 101 to 103 from each individual antenna element of the plurality of antenna elements of the terminal device 31 are received in steps 201 to 203. Thus, a detailed channel sounding of the radio resource between the terminal device 31 and the base station 20 has been performed. In step 204 the base station may receive raw pilot signals from other terminal devices, for example from the terminal devices 32 to 39. The base station 20 may consider this additional channel sounding information in further processing.

In step 205 the base station 20 may allocate resources to the terminal devices 31 to 39 based on the channel sounding information. For example, the base station 20 may form MIMO groups based on the channel sounding information from the plurality of terminal devices 31 to 39. As an alternative, the base station 20 may continuously use previously determined MIMO group allocation and use the channel sounding information for determining a current state of the radio resources assigned to the terminal devices 31 to 39 according to the MIMO group allocation. Furthermore, in step 205 the base station may communicate the resource allocation to the terminal devices 31 to 39. Thus, in step 104, the terminal devices may be instructed to which MIMO groups they are assigned and which radio resources are to be used for communicating within these MIMO groups.

In step 206 the base station 20 determines for each channel to each terminal device 31 to 39 corresponding uplink receive and downlink transmit (precoding) parameters for communicating with the terminal devices 31 to 39.

In step 207 the base station 20 determines an uplink precoding information for each terminal device and each radio resource assigned to the corresponding terminal device. The uplink precoding information may comprise for example a phase and amplitude information to be used by the terminal device in connection with the corresponding radio resource. The phase and amplitude information may define for each antenna element of the terminal device a corresponding phase and amplitude configuration. Additionally or as an alternative, a plurality of phase and amplitude information sets may be provided as shared knowledge in the base station and the terminal devices. In this case, the base station may communicate a reference to a corresponding set of the predefined phase and amplitude information. In other words, the base station may estimate the channel characteristics for the radio resource and may derive an optimized precoding as the uplink precoding information. Further, additionally or as an alternative, the base station may transmit a precoded downlink pilot signal to the terminal device using the downlink transmit parameters (precoding). Based on the received downlink pilot signal, the terminal device may determine corresponding receive and transmit parameters (phase and amplitude information) for each antenna element. Additionally, in step 207 the base station transmits the uplink precoding information to the terminal device 31.

The terminal device 31 receives in step 105 for each resource corresponding uplink precoding information from the base station 20 and determines for each resource a corresponding uplink precoding based on the uplink precoding information. The uplink precoding may be used subsequently for transmitting precoded uplink pilot signals for subsequent adaptions of the precoding parameters in the base station 20 as will be described in more detail in connection with FIG. 3.

FIG. 3 shows method steps performed by the terminal device 31 and the base station 20 for adapting the downlink precodings and uplink receive parameters in the base station 20 to maintain coherence of the MIMO communication between the terminal device 31 and the base station 20 for the MIMO groups to which the terminal device 31 belongs. In the example of FIG. 1, the terminal device 31 is assigned to for example two MIMO groups. In step 107 the terminal device 31 transmits a first uplink pilot signal using a first uplink radio resource (assigned to a first group of the two MIMO groups) and using a corresponding first uplink precoding (determined in step 106). The first uplink pilot signal is transmitted via antenna elements 312 of the terminal device 31 with a corresponding phase and amplitude individually defined for each antenna element by the first uplink precoding. By use of the first uplink precoding a spatial orthogonality of the transmitted first uplink pilot signal may be optimized with respect to uplink pilot signals transmitted from other terminal devices of the group of multiplexed terminal devices using the same first uplink radio resource and with respect to uplink pilot signals associated to other groups. Also in step 107, the terminal device 31 transmits a second uplink pilot signal using a second uplink radio resource (assigned to a second group of the two MIMO groups) and using a corresponding second uplink precoding (determined in step 106). The second uplink pilot signal is transmitted via antenna elements 312 of the terminal device 31 with a corresponding phase and amplitude individually defined for each antenna element by the second uplink precoding. In case the terminal device 31 belongs to a further MIMO group, the terminal device 31 may transmit a further uplink pilot signal using a further uplink radio resource and further uplink precoding for channel sounding a communication channel (resource) allocated for the further MIMO group.

In step 208 the base station 20 receives the first and second uplink pilot signals at the plurality of antenna elements 23 to 25. In case the terminal device 31 has sent further uplink pilot signals, these are also received by the base station 20. In step 209 the base station 20 adjusts its downlink precoding and uplink receive parameters concerning the first radio resource based on a receive property of the first uplink pilot signal. Furthermore, the base station 20 adjusts its downlink precoding and uplink receive parameters concerning the second radio resource based on a receive property of the second uplink pilot signal. In case of further uplink pilot signals, the base station 20 adjusts its further downlink precoding and uplink receive parameters concerning the further radio resources based on further receive properties of the further uplink pilot signals.

In step 108 the terminal device 31 may transmit on each radio resource payload and/or control data using a corresponding uplink precoding. In step 210 the data sent on each radio resource from the terminal device 31 is received by the base station 20 using the corresponding uplink receive parameters.

Likewise, in step 211 the base station 20 transmits on each radio resource payload and/or control data using a corresponding downlink precoding. In step 109 the data sent on each radio resource from the base station 20 is received by the terminal device 31 using the corresponding receive parameters.

As an alternative to the initial uplink precoding determination described in connection with FIG. 2, the terminal device 31 may try different pilot vectors and use group allocation in combination with received power level and requested transmit power to determine optimal pilot vectors.

For example, the terminal device 31 may transmit subsequently from the plurality of antenna elements 312 of the terminal device 31 a plurality of uplink pilot signals using for each of the uplink pilot signals a radio resource and a corresponding uplink precoding selected from a plurality of predetermined uplink precodings. Each subsequent transmission of the uplink pilot signals uses a different uplink precoding. The subsequently transmitted uplink pilot signals from the terminal device 31 are received at the plurality of antenna elements 23-25 of the base station 20. The base station 20 determines for each received uplink pilot signal corresponding quality information based on receive properties of the received uplink pilot signals. The plurality of quality information is transmitted from the base station 20 to the terminal device 31, and the terminal device 31 selects, based on the received plurality of quality information, one of the plurality of the predetermined uplink precodings as the uplink precoding for this radio resource.

The invention claimed is:

1. A method for operating a terminal device of a multiple-input and multiple-output (MIMO) system, the method comprising:
    transmitting, from each individual antenna element of a plurality of antenna elements of the terminal device, corresponding raw uplink pilot signals on a dedicated time and frequency resource;
    before transmitting precoded uplink pilot signals to a base station of the MIMO system, receiving, from the base station in response to transmitting from each individual antenna element the corresponding raw uplink pilot signals, an uplink precoding information assigned to a radio resource of a transmission frame of the MIMO system for transmitting uplink signals from the plurality of antenna elements of the terminal device to the base station, wherein the uplink precoding information is determined based on a plurality of receive properties of the raw uplink pilot signals;
    determining, at the terminal device, an uplink precoding assigned to the radio resource based on the uplink precoding information; and
    transmitting, from the plurality of antenna elements, an uplink pilot signal assigned to the radio resource using the uplink precoding.

2. The method of claim 1, further comprising:
    determining a further uplink precoding assigned to the radio resource, wherein the uplink precoding and further uplink precoding are different; and
    transmitting, from the plurality of antenna elements, a further uplink pilot signal assigned to the radio resource using the further uplink precoding.

3. The method of claim 2, wherein the uplink pilot signal and the further uplink pilot signal are transmitted from the plurality of antenna elements at a same time.

4. The method of claim 1, wherein the uplink precoding is a first uplink precoding, the radio resource is a first radio resource and the uplink pilot signal is a first uplink pilot signal, wherein the method further comprises:
    determining a second uplink precoding assigned to a second radio resource of the transmission frame of the MIMO system for transmitting uplink signals from the plurality of antenna elements of the terminal device to the base station of the MIMO system; and transmitting, from the plurality of antenna elements, a second uplink pilot signal assigned to the second radio resource using the second uplink precoding.

5. The method of claim 4, wherein the first radio resource is located to a first group of spatially multiplexed terminal devices operated in the MIMO system, and the second radio resource is located to a second group of spatially multiplexed terminal devices operated in the MIMO system.

6. The method of claim 2, further comprising:
receiving, in response to transmitting from each individual antenna element the corresponding raw uplink pilot signals, a further uplink precoding information assigned to the radio resource from the base station; and
determining, at the terminal device, the further uplink precoding based on the further uplink precoding information.

7. The method of claim 4, further comprising:
receiving, in response to transmitting from each individual antenna element the corresponding raw uplink pilot signals, a second uplink precoding information assigned to a second radio resource from the base station; and
determining, at the terminal device, the second uplink precoding based on the second uplink precoding information.

8. The method of claim 1, wherein the raw uplink pilot signals comprise uplink pilot signals without precoding.

9. The method of claim 1, wherein the uplink precoding information is determined at the base station based on the plurality of receive properties of the raw uplink pilot signals only.

10. A method for operating a base station of a multiple-input and multiple-output (MIMO) system the method comprising:
before receiving precoded uplink pilot signals from a terminal device, receiving raw uplink pilot signals, the raw uplink pilot signals being transmitted from each individual antenna element of a plurality of antenna elements of the terminal device on a dedicated time and frequency resource;
determining a downlink precoding and uplink receive parameters for communicating signals between a plurality of antenna elements of the base station and the terminal device using a radio resource of a transmission frame of the MIMO system based on a plurality of receive properties of the received raw uplink pilot signals;
transmitting uplink precoding information assigned to the radio resource to the terminal device, the uplink precoding information being determined based on the plurality of receive properties of the received raw uplink pilot signals;
receiving, at the plurality of antenna elements of the base station, an uplink pilot signal assigned to the radio resource, wherein the uplink pilot signal is transmitted from the terminal device using the uplink precoding information; and
adjusting the downlink precoding and the uplink receive parameters based on a receive property of the uplink pilot signal.

11. The method of claim 10, further comprising:
determining a further downlink precoding and further uplink receive parameters for communicating signals between the plurality of antenna elements of the base station and the terminal device using the radio resource of the transmission frame of the MIMO system, wherein the downlink precoding and the further downlink precoding are different, and wherein the uplink receive parameters and the further uplink receive parameters are different;
receiving, at the plurality of antenna elements of the base station, a further uplink pilot signal assigned to the radio resource, wherein the further uplink pilot signal is transmitted from the terminal device using a further uplink precoding which is different from the uplink precoding; and
adjusting the further downlink precoding and the further uplink receive parameters based on a receive property of the further uplink pilot signal.

12. The method of claim 10, wherein the downlink precoding is a first downlink precoding, the uplink receive parameters are first uplink receive parameters, the radio resource is a first radio resource, the uplink pilot signal is a first uplink pilot signal, and the uplink precoding is a first uplink precoding, wherein the method further comprises:
determining a second downlink precoding and second uplink receive parameters for communicating signals between the plurality of antenna elements of the base station and the terminal device using a second radio resource of the transmission frame of the MIMO system;
receiving, at the plurality of antenna elements of the base station, a second uplink pilot signal assigned to the second radio resource, wherein the second uplink pilot signal is transmitted from the terminal device using a second uplink precoding; and
adjusting the second downlink precoding and the second uplink receive parameters based on a receive property of the second uplink pilot signal.

13. The method of claim 11, further comprising:
determining the further downlink precoding and the further uplink receive parameters for communicating signals between the plurality of antenna elements of the base station and the terminal device using the radio resource based on the plurality of receive properties of the raw uplink pilot signals that were received;
determining further uplink precoding information assigned to the radio resource based on the plurality of receive properties of the raw uplink pilot signals that were received; and
transmitting the further uplink precoding information to the terminal device.

14. The method of claim 12, further comprising:
determining the second downlink precoding and the second uplink receive parameters for communicating signals between the plurality of antenna elements of the base station and the terminal device using a second radio resource based on the plurality of receive properties of the raw uplink pilot signals that were received;
determining second uplink precoding information assigned to the second radio resource based on the plurality of receive properties of the raw uplink pilot signals that were received; and
transmitting the second uplink precoding information to the terminal device.

15. A terminal device for a multiple-input and multiple-output (MIMO) system, the terminal device comprising:
a plurality of antenna elements; and
one or more processors configured to perform operations comprising:
transmitting, from each individual antenna element of a plurality of antenna elements of the terminal device, corresponding raw uplink pilot signals on a dedicated time and frequency resource;

before transmitting precoded uplink pilot signals to a base station of the MIMO system, receiving, from the base station in response to transmitting from each individual antenna element the corresponding raw uplink pilot signals, an uplink precoding information assigned to a radio resource of a transmission frame of the MIMO system for transmitting uplink signals from the plurality of antenna elements of the terminal device to the base station, wherein the uplink precoding information is determined based on a plurality of receive properties of the raw uplink pilot signals;

determining, at the terminal device, an uplink precoding assigned to the radio resource based on the uplink precoding information; and transmitting, via the plurality of antenna elements, an uplink pilot signal assigned to the radio resource using the uplink precoding.

16. A base station for a multiple-input and multiple-output (MIMO) system, the base station comprising:

a plurality of antenna elements; and one or more processors configured to perform operations comprising:

before receiving precoded uplink pilot signals from a terminal device, receiving raw uplink pilot signals, the raw uplink pilot signals being transmitted from each individual antenna element of a plurality of antenna elements of the terminal device on a dedicated time and frequency resource;

determining a downlink precoding and uplink receive parameters for communicating signals between the plurality of antenna elements and the terminal device using a radio resource of a transmission frame of the MIMO system based on a plurality of receive properties of the received raw uplink pilot signals;

transmitting uplink precoding information assigned to the radio resource to the terminal device, the uplink precoding information being determined based on the plurality of receive properties of the received raw uplink pilot signals;

receiving, at the plurality of antenna elements, an uplink pilot signal assigned to the radio resource, wherein the uplink pilot signal is transmitted from the terminal device using the uplink precoding information; and adjusting the downlink precoding and the uplink receive parameters based on a receive property of the uplink pilot signal.

* * * * *